US012699443B2

(12) United States Patent
Dai et al.

(10) Patent No.: US 12,699,443 B2
(45) Date of Patent: Aug. 4, 2026

(54) MOTION CAPTURE METHOD AND APPARATUS, ELECTRONIC DEVICE, AND STORAGE MEDIUM

(71) Applicant: Beijing Zitiao Network Technology Co., Ltd., Beijing (CN)

(72) Inventors: Peng Dai, Beijing (CN); Yang Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 7 days.

(21) Appl. No.: 18/821,371

(22) Filed: Aug. 30, 2024

(65) Prior Publication Data

US 2025/0076972 A1 Mar. 6, 2025

(30) Foreign Application Priority Data

Sep. 5, 2023 (CN) .......................... 202311140272.7

(51) Int. Cl.
| | |
|---|---|
| *G06F 3/01* | (2006.01) |
| *G06F 3/0346* | (2013.01) |
| *G06N 3/044* | (2023.01) |
| *G06T 13/40* | (2011.01) |
| *G06T 19/00* | (2011.01) |

(52) U.S. Cl.
CPC ............ *G06F 3/012* (2013.01); *G06F 3/0346* (2013.01); *G06N 3/044* (2023.01); *G06T 13/40* (2013.01); *G06T 19/006* (2013.01)

(58) Field of Classification Search
CPC ... A61B 5/1116; A61B 5/1118; A61B 5/7267; A61B 5/7275; A61B 2562/0219; G06F 18/24; G06F 3/011; G06F 3/012; G06F 3/014; G06F 3/017; G06F 3/0346; G06F 2218/12; G06N 3/044; G06N 3/045; G06N 3/08; G06T 13/40; G06T 19/006
See application file for complete search history.

(56) References Cited

U.S. PATENT DOCUMENTS

| | | |
|---|---|---|
| 12,303,255 B1 * | 5/2025 | Schnan Mastronardi ................... A61B 5/7267 |
| 2020/0034978 A1 * | 1/2020 | Giurgica-Tiron ........ G06N 3/09 |
| 2022/0269346 A1 | 8/2022 | Hussami et al. |

FOREIGN PATENT DOCUMENTS

| | | |
|---|---|---|
| CN | 114417738 B | 6/2022 |

OTHER PUBLICATIONS

Extended European Search Report for European Application No. 24196809.8, mailed Jan. 3, 2025, 9 pages.

* cited by examiner

*Primary Examiner* — Nelson M Rosario

(57) ABSTRACT

The present disclosure provides a motion capture method and apparatus, an electronic device, and a storage medium. The method comprises: obtaining human inertial data collected by an extended reality device; and obtaining human pose information by inputting the human inertial data into a pre-trained motion capture model, where the motion capture model is obtained by training a neural network model based on a preset loss function; and the motion capture model comprises one or more of a neural network for predicting a human pose, a neural network for predicting global displacement information, a neural network for predicting a human bone parameter, and a classification network for predicting a human ground-stepping state.

20 Claims, 3 Drawing Sheets

S01

Obtain human inertial data collected by an extended reality device

S02

Obtain human pose information by inputting the human inertial data into a pre-trained motion capture model, where the motion capture model is obtained by training a neural network model based on a preset loss function, and the motion capture model comprises one or more of a neural network for predicting a human pose, a neural network for predicting global displacement information, a neural network for predicting a human bone parameter, and a classification network for predicting a human ground-stepping state

Figure 1:
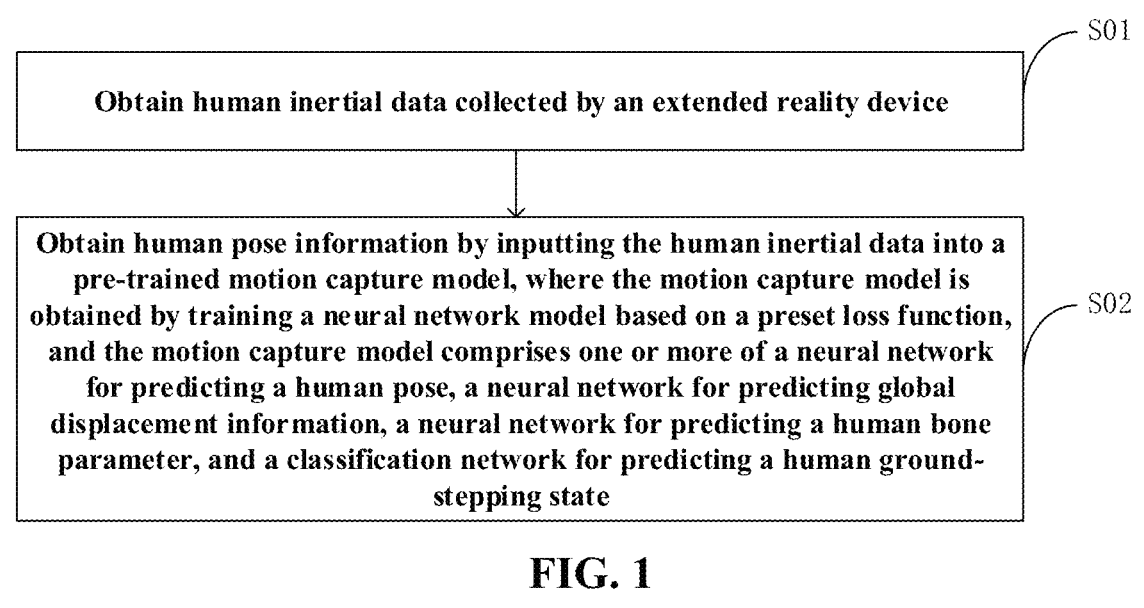

S01

Obtain human inertial data collected by an extended reality device

Obtain human pose information by inputting the human inertial data into a pre-trained motion capture model, where the motion capture model is obtained by training a neural network model based on a preset loss function, and the motion capture model comprises one or more of a neural network for predicting a human pose, a neural network for predicting global displacement information, a neural network for predicting a human bone parameter, and a classification network for predicting a human ground-stepping state

MOTION CAPTURE METHOD AND APPARATUS, ELECTRONIC DEVICE, AND STORAGE MEDIUM

CROSS-REFERENCE TO RELATED APPLICATION(S)

This application claims priority to Chinese Application No. 202311140272.7 filed on Sep. 5, 2023, the disclosure of which is incorporated herein by reference in its entity.

FIELD

The present disclosure relates to the technical field of intelligent terminals, and in particular to a motion capture method and apparatus, an electronic device, and a storage medium.

BACKGROUND

A human motion capture technology refers to capturing pose and motion data of human motions in a scenario through certain sensors, and based on these motion and pose data, a virtual image model may be driven or behavioral analysis may be performed.

SUMMARY

The section Summary is provided to give a brief overview of concepts, which will be described in detail later in the section Detailed Description of Embodiments. The section Summary is neither intended to identify key or necessary features of the technical solutions claimed for protection, nor is it intended to be used to limit the scope of the technical solutions claimed for protection.

The present disclosure provides a motion capture method and apparatus, an electronic device, and a storage medium.

The present disclosure uses the following technical solutions.

In some embodiments, the present disclosure provides a motion capture method, including:

obtaining human inertial data collected by an extended reality device; and obtaining human pose information by inputting the human inertial data into a pre-trained motion capture model, where the motion capture model is obtained by training a neural network model based on a preset loss function; and the motion capture model comprises one or more of a neural network for predicting a human pose, a neural network for predicting global displacement information, a neural network for predicting a human bone parameter, and a classification network for predicting a human ground-stepping state.

In some embodiments, the present disclosure provides a motion capture apparatus, including:

an obtaining module, configured to obtain human inertial data collected by an extended reality device; and a processing module, configured to obtain human pose information by inputting the human inertial data into a pre-trained motion capture model, where the motion capture model is obtained by training a neural network model based on a preset loss function; and the motion capture model comprises one or more of a neural network for predicting a human pose, a neural network for predicting global displacement information, a neural network for predicting a human bone parameter, and a classification network for predicting a human ground-stepping state.

In some embodiments, the present disclosure provides an electronic device, including at least one memory and at least one processor, where the memory is configured to store program code, and the processor is configured to invoke the program code stored in the memory to perform the above method.

In some embodiments, the present disclosure provides a computer-readable storage medium. The computer-readable storage medium is configured to store program code. The program code, when run by a processor, causes the processor to execute the above method.

BRIEF DESCRIPTION OF THE DRAWINGS

The above and other features, advantages, and aspects of various embodiments of the present disclosure will become more apparent in conjunction with the accompanying drawings and with reference to following specific implementations. Throughout the accompanying drawings, the same or similar reference numerals denote the same or similar elements. It should be understood that the accompanying drawings are illustrative, and components and elements may not necessarily be drawn to scale.

FIG. 1 is a flowchart of a motion capture method according to an embodiment of the present disclosure.

DETAILED DESCRIPTION OF EMBODIMENTS

Figure 2:
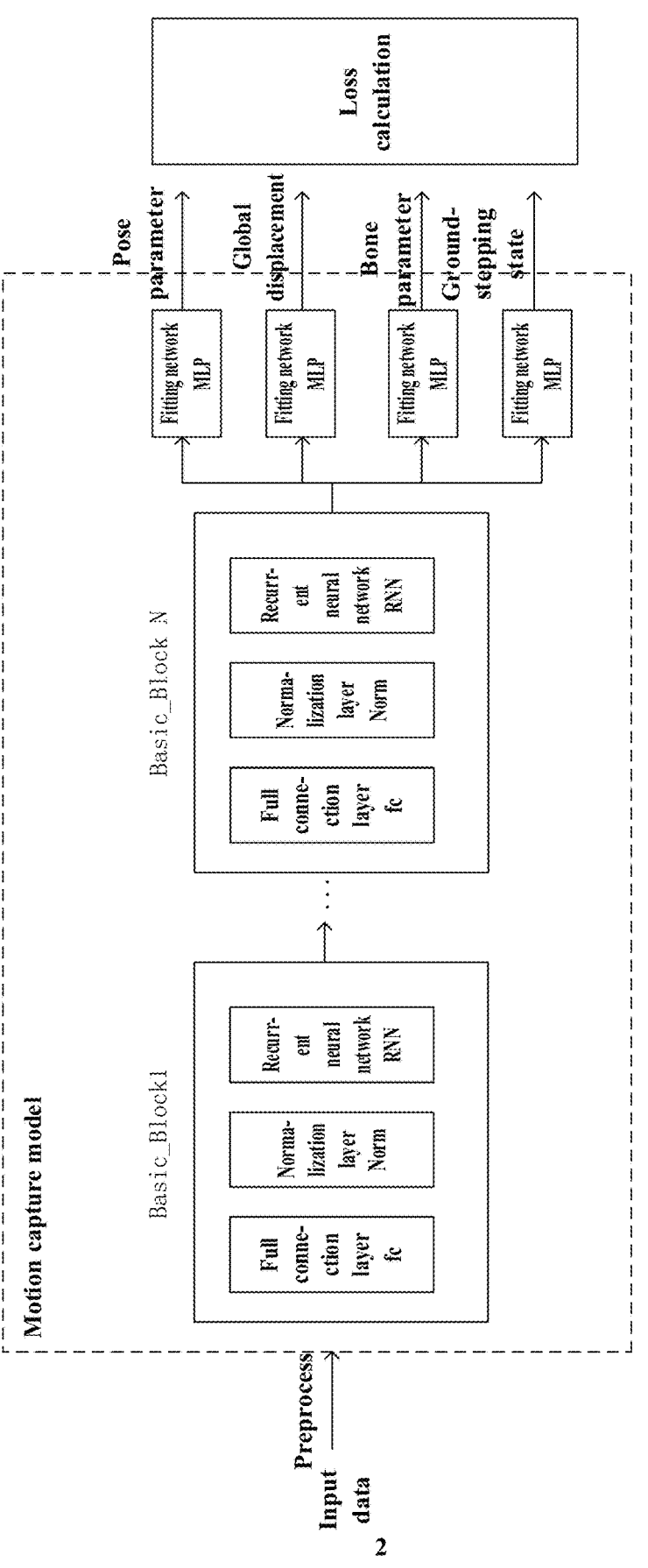
FIG. 2 is a structural schematic diagram of a motion capture model according to an embodiment of the present disclosure.

The embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. On the contrary, these embodiments are provided for a more thorough and complete understanding of the present disclosure. It should be understood that the accompanying drawings and the embodiments of the present disclosure are for exemplary purposes only, and are not intended to limit the scope of protection of the present disclosure.

It should be understood that the steps recorded in the method implementations in the present disclosure may be performed in different orders and/or in parallel. In addition, additional steps may be included and/or the execution of the illustrated steps may be omitted in the method implementations. The scope of the present disclosure is not limited in this aspect.

The term "including" used herein and variations thereof are open-ended, namely "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". Related definitions of other terms will be given in the description below. The term "in response to" and related terms refer to a signal or an event being affected by another signal or event to some extent, but not necessarily completely or directly affected. If an event x occurs "in response to" an event y, x may respond directly or indirectly to y. For example, the emergence of y may ultimately lead to the emergence of x, but there may be other intermediate events and/or conditions. In other cases, y may not necessarily lead to the emergence of x, and x may occur even if y has not yet occurred. In addition, the term "in response to" may also mean "at least partially in response to".

The term "determine" broadly covers various actions, including obtaining, calculating, computing, processing, deriving, researching, searching (e.g., searching in a table, a database, or other data structures), ascertaining, and similar actions, and also including receiving (e.g., receiving a message), accessing (e.g., accessing data in a memory), and similar actions, as well as parsing, selecting, choosing, establishing, and similar actions. Related definitions of other terms will be given in the description below. Related definitions of other terms will be given in the description below.

It should be noted that concepts such as "first" and "second" mentioned in the present disclosure are only used to distinguish different apparatuses, modules, or units, and are not used to limit the order or relation of interdependence of functions performed by these apparatuses, modules, or units.

It should be noted that the modification of "a" mentioned in the present disclosure is indicative rather than limiting, and those skilled in the art should understand that unless otherwise explicitly specified in the context, it should be interpreted as "one or more".

The names of messages or information exchanged between a plurality of apparatuses in the implementations of the present disclosure are provided for illustrative purposes only, and are not used to limit the scope of these messages or information.

It should be noted that a sensor used for human motion capture may be an inertial sensor, such as an inertial measurement unit (IMU), or may also be a trichromatic camera or a depth camera. Depending on different types of sensors that are used, motion capture methods provided by the related art may be divided into the following four categories: an optical motion capture method, an inertial motion capture method, a visual motion capture method, and a hybrid motion capture method. In addition to the inertial motion capture method, the other three solutions require deploying additional devices in the scenario, which are not suitable for application scenarios such as extended reality (XR). Extended reality comprises augmented reality (AR), mixed reality (MR), and virtual reality (VR).

However, the inertial motion capture method in the related art requires the use of a large number of IMU sensors, and regardless of adopting a wired wearing solution or wearing a specially made jacket, is time-consuming, and prone to the problem of wearing order errors, affecting user experience, and therefore, is also not suitable for application scenarios such as XR.

For the above problem, the related art also provides an inertial motion capture technical solution based on a sparse IMU, which uses 6 IMU sensors at a hardware level to be respectively placed on the left wrist, the right wrist, the lower left knee, the lower right knee, the head, and the waist of the human body. The method only adopts the IMU sensors, which cannot provide precise three-dimensional positioning information.

At an algorithm level, in the related art, inertial data measured by the inertial sensors at the left wrist, the right wrist, the lower left knee, the lower right knee, the head, and the waist of the human body is firstly collected, and then, the bone orientation and acceleration of the bones in a human coordinate system are obtained based on the inertial data. The bone orientation and the acceleration are input into a preset human kinematics model to predict a human pose, a joint point motion speed, and human-ground contact information. Finally, the human pose, the joint point motion speed, and the human-ground contact information are input into a preset human dynamics model to predict a human pose, motion, joint force, and ground reaction force.

It can be seen that the motion capture algorithm provided by the related art is not an end-to-end learnable method, which requires an iterative post-processing process, and therefore there are problems of long consumption time, limited model performance, etc.

In summary, the inertial motion capture technology methods based on the sparse IMU in the related art all use six IMU sensors. In addition, at the algorithm level, the related art needs to adopt a human dynamics post-processing module to calculate six-degree-of-freedom (6DoF) information, making it difficult to achieve end-to-end learning and inference.

In order to solve the above problems, the solutions provided by the embodiments of the present disclosure are described in detail in conjunction with the accompanying drawings.

According to the motion capture method provided by the embodiments of the present disclosure, the human inertial data collected by the extended reality device is collected; and then, the human inertial data is input into the pre-trained motion capture model to obtain the human pose information, where the motion capture model is obtained by training the neural network model based on the preset loss function, and the motion capture model comprises one or more of the neural network for predicting the human pose, the neural network for predicting the global displacement information, the neural network for predicting the human bone parameter, and the classification network for predicting the human ground-stepping state. It can be seen that the embodiments of the present disclosure may accurately estimate the pose information of full-body joint points of a user based on the extended reality device and the motion capture model.

As shown in FIG. 1, FIG. 1 is a flowchart of a motion capture method according to an embodiment of the present disclosure. The following steps are included.

Step S01: Obtain human inertial data collected by an extended reality device.

In some embodiments, the present disclosure adopts a hardware system solution combining an extended reality head-mounted device and IMU sensors, including a head-mounted device, two handheld controllers, a waist sensor, and two leg sensors. The IMU sensors are integrated in the head-mounted device and used to output inertial data of the human head. In addition, a simultaneous localization and mapping (SLAM) technology is also integrated in the head-mounted device, which may output three-dimensional coordinate data of the human head. The IMU sensors are integrated in the two handheld controllers and used to output inertial data of the two hands. In addition, three-dimensional coordinate data of a gamepad may also be output through sensing measurement between the head-mounted device and the handheld controllers.

In some embodiments, human inertial data $X_t$ is obtained through the head-mounted device, the handheld controllers, the waist sensor, and the leg sensors. Before inputting an obtained set of timing data $X=\{X_1, X_2, \ldots, X_t\}$ into a motion capture model, an input data preprocessing operation is required, which aims to represent each frame of input data $X_t$ as a feature vector $f_t$, thereby facilitating processing by the motion capture model. Each frame of human inertial data $X_t$ comprises orientation data and acceleration data of six IMU sensors, as well as coordinate system xyz-axis data of three MU sensors (the head-mounted device and the handheld controllers).

It can be seen that this embodiment of the present disclosure adopts the extended reality head-mounted device and the handheld controllers to replace the IMU sensors arranged on the left and right hands and the head in the related art. In addition, due to the integration of the SLAM technology in the extended reality device, three-dimensional position data of the human head may also be output, thereby obviously improving 6DoF positioning accuracy of the human body.

Step S02: Obtain human pose information by inputting the human inertial data into a pre-trained motion capture model.

The motion capture model is obtained by training a neural network model based on a preset loss function; and the motion capture model comprises one or more of a neural network for predicting a human pose, a neural network for predicting global displacement information, a neural network for predicting a human bone parameter, and a classification network for predicting a human ground-stepping state.

In some embodiments, as shown in FIG. 2, the motion capture model mainly comprises two parts: a backbone network (i.e., backbone, such as a feature fusion network) and a head network (i.e., head, including a pose estimation network, a root node global displacement estimation network, a bone length estimation network, and a ground-stepping state binary classification network). The backbone network is composed of N basic_blocks with the same structure. Each basic_block comprises a full connection (FC) layer, a normalization layer (LayerNorm), and a recurrent neural network (RNN) structure. The main function of the backbone network is to fuse timing feature information. The motion capture model of the present disclosure comprises four head networks, which are used to estimate a full-body pose, global displacement information of a root node, a bone parameter, and ground-stepping state information respectively. Each head network is composed of a fitting network (e.g., a multi-layer perceptron (MLP)).

In some embodiments, after inputting preprocessed IMU sensor data into the motion capture model, human pose parameters are output, including six-freedom-of-degree information, global displacement information, a bone parameter, and a ground-stepping state.

In some embodiments, the motion capture model is obtained by training the neural network model based on the preset loss function. The training of the neural network model comprises following seven loss functions (Loss), and a final loss function is obtained by weighted summation of the following seven loss functions:

1. Human pose prediction loss function: obtained by calculating a mean squared error between model predicted human pose parameters and truth value pose parameters.

2. Root node position estimation loss function: obtained by calculating a mean squared error between model predicted root node three-dimensional coordinate parameters and truth value root node three-dimensional coordinate parameters.

3. Bone length estimation loss function: obtained by calculating a mean squared error between model predicted bone parameters and truth value bone parameters.

4. Joint point position estimation loss function: obtained by calculating a mean squared error between a model predicted joint point position and truth value joint point position parameters, where the model predicted joint point position is calculated by the model predicted pose parameters, the model predicted root node three-dimensional coordinate parameters, and the model predicted bone parameters.

5. Smoothness loss function: introduced in this embodiment of the present disclosure to ensure the temporal smoothness of an output pose result as much as possible.

6. Ground-stepping binary classification loss function: obtained by calculating a binary cross entropy between model predicted ground-stepping parameters and truth value ground-stepping parameters, where two aspects of determination and comparison are included: one is to determine whether the current foot is stationary, and the other one is to determine whether a height from the current foot to a ground plane is less than a preset threshold.

7. Sliding step loss function: three-dimensional coordinates of a human joint point need to be calculated based on model predicted pose data, a root node position, and a bone length. In time sequence, due to estimation errors in the pose parameters, the root node position, and the bone length of the model, calculated left and right foot joint points of the human body have the problem of fluctuation in time sequence, representing a phenomenon that the legs constantly move relative to the ground when a person is standing stationary, namely a sliding step problem. For the problem, this embodiment of the present disclosure introduces the sliding step loss function. For the foot that is stepping on the ground, the timing motion speed is calculated as a sliding step loss. A higher speed indicates a more severe sliding step phenomenon, resulting in a greater loss value. By minimizing the sliding step loss of the model, the sliding step problem of the model is avoided on the basis of ensuring 6DoF estimation precision.

It can be seen that this embodiment of the present disclosure provides an RNN-based model structure that may output 6DoF information of all human joint points from end to end. By introducing both the smoothness loss function and the sliding step loss function, problems such as jitter and sliding steps can be avoided without the need for introducing additional post-processing logic.

According to the motion capture method provided by this embodiment of the present disclosure, the human inertial data collected by the extended reality device is collected; and then, the human inertial data is input into the pre-trained motion capture model to obtain the human pose information, where the motion capture model is obtained by training the neural network model based on the preset loss function, and the motion capture model comprises one or more of the neural network for predicting the human pose, the neural network for predicting the global displacement information, the neural network for predicting the human bone parameters, and the classification network for predicting the human ground-stepping state. It can be seen that the embodiments of the present disclosure may accurately estimate the pose information of full-body joint points of the user based on the extended reality device and the motion capture model.

In some embodiments, the extended reality device comprises a head-mounted device, a handheld controller, a waist sensor, and a leg sensor, where the head-mounted device, the handheld controller, the waist sensor, and the leg sensor include inertial sensors for collecting human inertial data.

In some embodiments, before the obtaining human inertial data collected by an extended reality device, the method further comprises:

preprocessing the human inertial data to obtain a feature vector for being input into the motion capture model.

In some embodiments, the preprocessing process is as follows:

1. Convert orientation matrices of a plurality of IMU sensors into 6D vectors.
2. Calculate angular velocity information of each IMU sensor (by multiplying the inverse of the orientation matrix of a $(t-1)^{th}$ frame with the orientation matrix of a $t^{th}$ frame), and convert the angular velocity information into a 6D vector.
3. Calculate velocity information of a total of three IMU sensors, including the head-mounted device and the two handheld controllers (subtracting xyz coordinates of the $(t-1)^{th}$ frame from xyz coordinates of the $t^{th}$ frame).
4. Integrate all the information from 1 to 3, as well as data of all the IMU sensors (e.g., acceleration data), to obtain a one-dimensional feature vector $f_r$.

In some embodiments, the training a neural network model based on a preset loss function comprises:

preprocessing and inputting human inertial data for model training into a neural network model, and fusing timing feature information of the human inertial data based on a feature fusion network of the neural network model, where the feature fusion network is composed of a full connection layer, a normalization layer, and a recurrent neural network;

outputting human pose parameters, global displacement information, a human bone parameter, and a human ground-stepping state through the neural network and the classification network; and calculating a corresponding loss value based on the human pose parameters, the global displacement information, the human bone parameters, the human ground-stepping state, and the preset loss function, and adjusting parameters of the neural network model based on the loss value until the loss value is less than a preset value, ending the training of the neural network model to obtain the motion capture model.

In some embodiments, the present disclosure may achieve a real-time full-body motion capture effect based on the extended reality device, and has a wide application prospect in the field of extended reality.

In some embodiments, the preset loss function is obtained through weighted summation of a human pose prediction loss function, a root node position estimation loss function, a bone length estimation loss function, a joint point position estimation loss function, a smoothness loss function, a ground-stepping binary classification loss function, and a sliding step loss function.

The human pose prediction loss function is obtained by calculating a mean squared error between model predicted human pose parameters and truth value pose parameters.

The root node position estimation loss function is obtained by calculating a mean squared error between model predicted root node three-dimensional coordinate parameters and truth value root node three-dimensional coordinate parameters.

The bone length estimation loss function is obtained by calculating a mean squared error between model predicted bone parameters and truth value bone parameters.

The joint point position estimation loss function is obtained by calculating a mean squared error between a model predicted joint point position and truth value joint point position parameters, where the model predicted joint point position is calculated by the model predicted pose parameters, the model predicted root node three-dimensional coordinate parameters, and the model predicted bone parameters.

The smoothness loss function is used to output a temporally smooth human pose result.

The ground-stepping binary classification loss function is obtained by calculating a binary cross entropy between model predicted ground-stepping parameters and truth value ground-stepping parameters.

The sliding step loss function is used to calculate a corresponding sliding step loss value based on a temporal motion speed of left and right foot joint points, and optimize the neural network model based on the sliding step loss value.

In some embodiments, the human pose parameters include six-freedom-of-degree information of human joint points.

In some embodiments, the method further comprises:

generating and displaying, based on the human pose parameters, a corresponding human motion in an extended reality environment.

An embodiment of the present disclosure further provides a motion capture apparatus, including:

an obtaining module, configured to obtain human inertial data collected by an extended reality device; and a processing module, configured to obtain human pose information by inputting the human inertial data into a pre-trained motion capture model.

The motion capture model is obtained by training a neural network model based on a preset loss function; and the motion capture model comprises one or more of a neural network for predicting a human pose, a neural network for predicting global displacement information, a neural network for predicting a human bone parameter, and a classification network for predicting a human ground-stepping state.

In some embodiments, the extended reality device comprises a head-mounted device, a handheld controller, a waist sensor, and a leg sensor, where the head-mounted device, the handheld controller, the waist sensor, and the leg sensor include inertial sensors for collecting human inertial data.

In some embodiments, the obtaining module is further specifically configured to:

preprocess the human inertial data to obtain a feature vector used to be input into the motion capture model.

In some embodiments, the processing module is specifically configured to:

preprocess and input human inertial data for model training into a neural network model, and fuse timing feature information of the human inertial data based on a feature fusion network of the neural network model, where the feature fusion network is composed of a full connection layer, a normalization layer, and a recurrent neural network;

output human pose parameters, global displacement information, human bone parameters, and a human ground-stepping state through the neural network and the classification network; and calculate a corresponding loss value based on the human pose parameters, the global displacement information, the human bone parameters, the human ground-stepping state, and the preset loss function, and adjust parameters of the neural network model based on the loss value until the loss value is less than a preset value, end the training of the neural network model to obtain the motion capture model.

In some embodiments, the preset loss function is obtained through weighted summation of a human pose prediction loss function, a root node position estimation loss function, a bone length estimation loss function, a joint point position estimation loss function, a smoothness loss function, a ground-stepping binary classification loss function, and a sliding step loss function.

The human pose prediction loss function is obtained by calculating a mean squared error between model predicted human pose parameters and truth value pose parameters.

The root node position estimation loss function is obtained by calculating a mean squared error between model predicted root node three-dimensional coordinate parameters and truth value root node three-dimensional coordinate parameters.

The bone length estimation loss function is obtained by calculating a mean squared error between model predicted bone parameters and truth value bone parameters.

The joint point position estimation loss function is obtained by calculating a mean squared error between a model predicted joint point position and truth value joint point position parameters, where the model predicted joint point position is calculated by the model predicted pose parameters, the model predicted root node three-dimensional coordinate parameters, and the model predicted bone parameters.

The smoothness loss function is used to output a temporally smooth human pose result.

The ground-stepping binary classification loss function is obtained by calculating a binary cross entropy between model predicted ground-stepping parameters and truth value ground-stepping parameters.

The sliding step loss function is used to calculate a corresponding sliding step loss value based on a temporal motion speed of left and right foot joint points, and optimize the neural network model based on the sliding step loss value.

In some embodiments, the human pose parameters include six-freedom-of-degree information of human joint points.

In some embodiments, the apparatus further comprises:

a display module, configured to generate and display, based on the human pose parameters, a corresponding human motion in an extended reality environment Because the embodiment of the apparatus basically corresponds to the method embodiment, reference is made to the partial description of the method embodiment for relevant parts. The apparatus embodiment described above is merely illustrative, and the modules described as separate modules may or may not be separate. Some or all of the modules may be selected according to actual needs to achieve the objectives of the solution of this embodiment. Those of ordinary skill in the art may understand and implement it without creative work.

The above is a description of the method and the apparatus of the present disclosure based on the embodiments and application examples. In addition, the present disclosure further provides an electronic device and a computer-readable storage medium. The electronic device and the computer-readable storage medium are described below.

Figure 3:
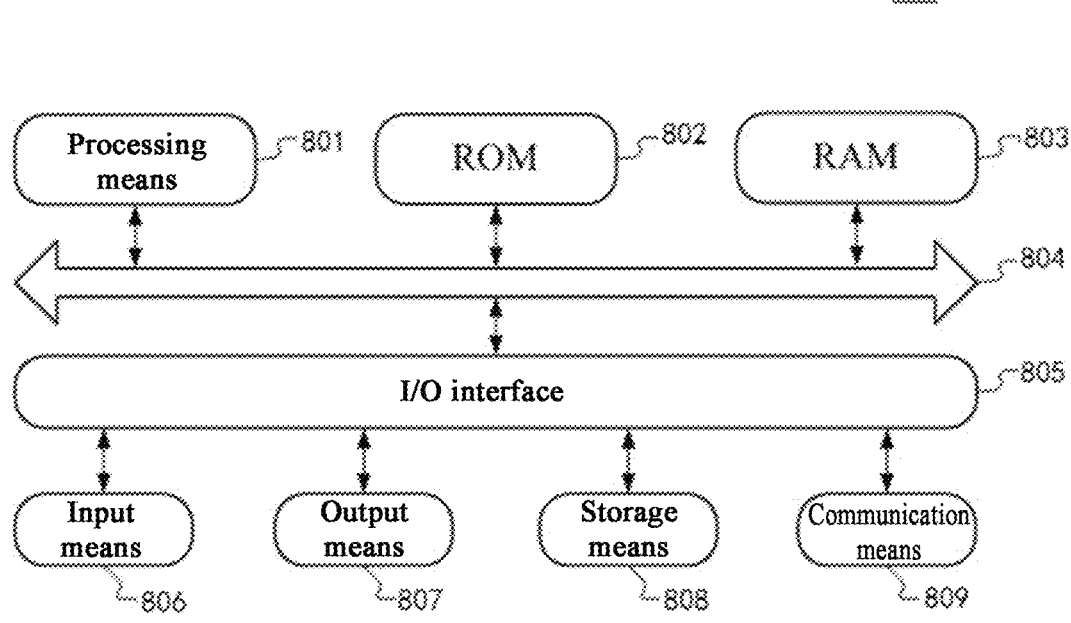
FIG. 3 is a structural schematic diagram of an electronic device according to an embodiment of the present disclosure.

Referring to FIG. 3 below, FIG. 3 illustrates a structural schematic diagram of an electronic device (e.g., a terminal device or a server) 800 suitable for implementing an embodiment of the present disclosure. The terminal device in this embodiment of the present disclosure may include, but is not limited to, mobile terminals such as a mobile phone, a notebook computer, a digital broadcast receiver, a personal digital assistant (PDA), a portable Android device (PAD), a portable media player (PMP), and a vehicle-mounted terminal (e.g., a vehicle navigation terminal), and fixed terminals such as a digital TV and a desktop computer. The electronic device shown in the figure is merely an example, which should not impose any limitations on functions and application ranges of this embodiment of the present disclosure.

The electronic device 800 may include a Processing means (e.g., a central processing unit and a graphics processing unit) 801 that may perform various suitable actions and processes based on a program stored in a read-only memory (ROM) 802 or a program loaded from a storage means 808 into a random access memory (RAM) 803. In the RAM 803, various programs and data needed by the operation of the electronic device 800 are also stored. The Processing means 801, the ROM 802, and the RAM 803 are connected to one another through a bus 804. An input/output (I/O) interface 805 is also connected to the bus 804.

Typically, the following apparatuses may be connected to the I/O interface 805: an input mean 806, including, for example, a touchscreen, a touchpad, a keyboard, a mouse, a camera, a microphone, an accelerometer, and a gyroscope; an output means 807, including, for example, a liquid crystal display (LCD), a speaker, and a vibrator; the storage means 808, including, for example, a magnetic tape and a hard drive; and a Communication means 809. The Communication means 809 may allow the electronic device 800 to be in wireless or wired communication with other devices for data exchange. Although the figure illustrates the electronic device 800 with various apparatuses, it should be understood that it is not necessary to implement or have all the shown apparatuses. It may be an alternative to implement or have more or fewer apparatuses.

Particularly, the foregoing process described with reference to the flowcharts according to the embodiments of the present disclosure may be implemented as a computer software program. For example, an embodiment of the present disclosure comprises a computer program product including a computer program stored on a non-transitory computer-readable medium. The computer program comprises program code for performing the method shown in the flowchart. In this embodiment, the computer program may be downloaded and installed from the network through the Communication means 809, or installed from the storage means 808, or installed from the ROM 802. The computer program, when executed by the Processing means 801, performs the above functions defined in the method in the embodiments of the present disclosure.

It should be noted that the non-transitory computer-readable medium in the present disclosure may be either a computer-readable signal medium or a computer-readable storage medium, or any combination of the two. The computer-readable storage medium may be, for example, but is not limited to, electric, magnetic, optical, electromagnetic, infrared, or semiconductor systems, apparatuses, or devices, or any combination of the above. More specific examples of the computer-readable storage medium may include, but are not limited to: an electrical connection with one or more wires, a portable computer disk, a hard drive, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination of the above. In the present disclosure, the computer-readable storage medium may be any tangible medium including or storing a program, and the program may be used by or in conjunction with an instruction execution system, apparatus, or device. However, in the present disclosure, the computer-readable signal medium may include a data signal propagated in a baseband or as a part of a carrier, where the data signal carries computer-readable program code. The propagated data signal may take various forms, including but not limited to an electromagnetic signal, an optical signal, or any suitable combination of the above. The computer-readable signal medium may also be any computer-readable medium other than the computer-readable storage medium. The computer-readable signal medium may send, propagate, or transmit a program for use by or for use in conjunction with the instruction execution system, apparatus, or device. The program code included in the computer-readable medium may be transmitted by any suitable medium including but not limited to a wire, an optical cable, radio frequency (RF), etc., or any suitable combination of the above.

In some implementations, a client and a server may communicate using any currently known or future-developed network protocols such as a hypertext transfer protocol (HTTP), and may also be interconnected with digital data communication in any form or medium (e.g., a communication network).Examples of the communication network include a local area network ("LAN"), a wide area network ("WAN"), an internetwork (e.g., the Internet), a peer-to-peer network (e.g., an ad hoc peer-to-peer network), and any currently known or future-developed network.

The computer-readable medium may be included in the above electronic device; or may also separately exist without being assembled in the electronic device.

The computer-readable medium carries one or more programs. The one or more programs, when executed by the electronic device, enable the electronic device to perform the above method of the present disclosure.

The computer program code for performing the operations of the present disclosure may be written in one or more programming languages or a combination thereof. The programming languages include object-oriented programming languages such as Java, Smalltalk, and C++, and further include conventional procedural programming languages such as "C" language or similar programming languages. The program code may be executed entirely on a user computer, partly on the user computer, as a stand-alone software package, partly on the user computer and partly on a remote computer, or entirely on the remote computer or the server. In the case of involving the remote computer, the remote computer may be connected to the user computer through any type of network, including a local area network (LAN) or a wide area network (WAN), or may be connected to an external computer (e.g., utilizing an Internet service provider for Internet connectivity).

The flowcharts and the block diagrams in the accompanying drawings illustrate the possibly implemented system architecture, functions, and operations of the system, the method, and the computer program product according to the various embodiments of the present disclosure. In this regard, each block in the flowcharts or the block diagrams may represent a module, a program segment, or a part of code, and the module, the program segment, or the part of code comprises one or more executable instructions for implementing specified logic functions. It should also be noted that in some alternative implementations, the functions marked in the blocks may also occur in an order different from that marked in the accompanying drawings. For example, two blocks shown in succession may actually be performed substantially in parallel, or may sometimes be performed in a reverse order, depending on functions involved. It should also be noted that each block in the block diagrams and/or the flowcharts, and a combination of the blocks in the block diagrams and/or the flowcharts may be implemented by using a dedicated hardware-based system that performs specified functions or operations, or may be implemented by using a combination of dedicated hardware and computer instructions.

The related units described in the embodiments of the present disclosure may be implemented by software or hardware. The name of the unit does not limit the unit in certain cases.

Herein, the functions described above may be at least partially executed by one or more hardware logic components. For example, without limitation, exemplary hardware logic components that can be used include: a field-programmable gate array (FPGA), an application specific integrated circuit (ASIC), an application specific standard part (ASSP), a system on chip (SOC), a complex programmable logic device (CPLD), etc.

In the context of the present disclosure, a machine-readable medium may be a tangible medium that may include or store a program for use by or for use in conjunction with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include an electrical connection based on one or more wires, a portable computer disk, a hard drive, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above content.

According to one or more embodiments of the present disclosure, a motion capture method is provided, and comprises:

obtaining human inertial data collected by an extended reality device; and obtaining human pose information by inputting the human inertial data into a pre-trained motion capture model, where the motion capture model is obtained by training a neural network model based on a preset loss function, and the motion capture model comprises one or more of a neural network for predicting a human pose, a neural network for predicting global displacement information, a neural network for predicting a human bone parameter, and a classification network for predicting a human ground-stepping state.

According to one or more embodiments of the present disclosure, the extended reality device comprises a head-mounted device, a handheld controller, a waist sensor, and a leg sensor, where the head-mounted device, the handheld controller, the waist sensor, and the leg sensor comprise inertial sensors for collecting human inertial data.

According to one or more embodiments of the present disclosure, the method further comprises, after obtaining the human inertial data collected by the extended reality device:

obtaining a feature vector for being input into the motion capture model by preprocessing the human inertial data.

According to one or more embodiments of the present disclosure, training the neural network model based on the preset loss function comprises:

preprocessing and inputting human inertial data for model training into a neural network model, and fusing timing feature information of the human inertial data based on a feature fusion network of the neural network model, where the feature fusion network comprises a full connection layer, a normalization layer, and a recurrent neural network;

outputting a human pose parameter, global displacement information, a human bone parameter, and a human ground-stepping state through the neural network and the classification network; and calculating a corresponding loss value based on the human pose parameter, the global displacement information, the human bone parameter, the human ground-stepping state, and the preset loss function, and adjusting a parameter of the neural network model based on the loss value until the loss value is less than a preset value, ending the training of the neural network model to obtain the motion capture model.

According to one or more embodiments of the present disclosure, the preset loss function is obtained through weighted summation of a human pose prediction loss function, a root node position estimation loss function, a bone length estimation loss function, a joint point position estimation loss function, a smoothness loss function, a ground-stepping binary classification loss function, and a sliding step loss function, The human pose prediction loss function is obtained by calculating a mean squared error between a model predicted human pose parameter and a truth value pose parameter;

The root node position estimation loss function is obtained by calculating a mean squared error between a model predicted root node three-dimensional coordinate parameter and a truth value root node three-dimensional coordinate parameter;

The bone length estimation loss function is obtained by calculating a mean squared error between a model predicted bone parameter and a truth value bone parameter;

The joint point position estimation loss function is obtained by calculating a mean squared error between a model predicted joint point position and a truth value joint point position parameter, and the model predicted joint point position is calculated by the model predicted pose parameter, the model predicted root node three-dimensional coordinate parameter, and the model predicted bone parameter;

The smoothness loss function is used to output a temporally smooth human pose result;

The ground-stepping binary classification loss function is obtained by calculating a binary cross entropy between a model predicted ground-stepping parameter and a truth value ground-stepping parameter; and The sliding step loss function is used to calculate a corresponding sliding step loss value based on a temporal motion speed of left and right foot joint points, and the neural network model is optimized based on the sliding step loss value.

According to one or more embodiments of the present disclosure, the human pose parameters include six-freedom-of-degree information of human joint points.

According to one or more embodiments of the present disclosure, the method further comprises:

generating and displaying, based on the human pose parameter, a corresponding human motion in an extended reality environment.

According to one or more embodiments of the present disclosure, a motion capture apparatus is provided, and comprises:

an obtaining module, configured to obtain human inertial data collected by an extended reality device; and a processing module, configured to obtain human pose information by inputting the human inertial data into a pre-trained motion capture model, where the motion capture model is obtained by training a neural network model based on a preset loss function, and the motion capture model comprises one or more of a neural network for predicting a human pose, a neural network for predicting global displacement information, a neural network for predicting a human bone parameter, and a classification network for predicting a human ground-stepping state.

According to one or more embodiments of the present disclosure, an electronic device is provided, and comprises at least one memory and a least one processor, where the at least one memory is used to store program code, and the at least one processor is configured to invoke the program code stored in the at least one memory to perform any of the above methods.

According to one or more embodiments of the present disclosure, a computer-readable storage medium is provided. The computer-readable storage medium is configured to store program code. The program code, when running on a processor, causes the processor to perform the above method.

What are described above are only preferred embodiments of the present disclosure and explanations of the technical principles applied. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure, such as a technical solution formed by replacing the foregoing features with the technical features with similar functions disclosed (but not limited to) in the present disclosure.

Further, although the operations are described in a particular order, it should not be understood as requiring these operations to be performed in the shown particular order or in a timing order. In certain environments, multitasking and parallel processing may be advantageous. Similarly, although several specific implementation details are included in the above discussion, these specific implementation details should not be interpreted as limitations on the scope of the present disclosure. Some features that are described in the context of separate embodiments may also be implemented in combination in a single embodiment. In contrast, various features described in the context of a single embodiment may also be implemented in a plurality of embodiments separately or in any suitable sub-combination.

Although the subject matter has been described in a language specific to structural features and/or logic actions of the method, it should be understood that the subject matter defined in the appended claims is not necessarily limited to the specific features or actions described above. On the contrary, the specific features and the actions described above are merely example forms for implementing the claims.

We claim:

1. A motion capture method, comprising:
obtaining human inertial data collected by an extended reality device; and
obtaining human pose information by inputting the human inertial data into a pre-trained motion capture model,
wherein the motion capture model is obtained by training a neural network model based on a preset loss function, and the motion capture model comprises one or more of a neural network for predicting a human pose, a neural network for predicting global displacement information, a neural network for predicting a human bone parameter, and a classification network for predicting a human ground-stepping state, and
wherein the preset loss function is constructed based on a sliding step loss function, and the sliding step loss function is constructed by calculating a temporal motion speed for a foot that is stepping on ground.

2. The method according to claim 1, wherein the extended reality device comprises a head-mounted device, a handheld controller, a waist sensor, and a leg sensor,
wherein the head-mounted device, the handheld controller, the waist sensor, and the leg sensor comprise inertial sensors for collecting human inertial data.

3. The method according to claim 1, wherein the method further comprises, after obtaining the human inertial data collected by the extended reality device:
obtaining a feature vector for being input into the motion capture model by preprocessing the human inertial data.

4. The method according to claim 1, wherein training the neural network model based on the preset loss function comprises:
preprocessing and inputting human inertial data for model training into a neural network model, and fusing timing feature information of the human inertial data based on a feature fusion network of the neural network model, wherein the feature fusion network comprises a full connection layer, a normalization layer, and a recurrent neural network;
outputting a human pose parameter, global displacement information, a human bone parameter, and a human ground-stepping state through the neural network and the classification network; and
calculating a corresponding loss value based on the human pose parameter, the global displacement information, the human bone parameter, the human ground-stepping state, and the preset loss function, and adjusting a parameter of the neural network model based on the loss value until the loss value is less than a preset value, ending the training of the neural network model to obtain the motion capture model.

5. The method according to claim 4, wherein the preset loss function is obtained through weighted summation of a human pose prediction loss function, a root node position estimation loss function, a bone length estimation loss function, a joint point position estimation loss function, a smoothness loss function, a ground-stepping binary classification loss function, and the sliding step loss function,
wherein the human pose prediction loss function is obtained by calculating a mean squared error between a model predicted human pose parameter and a truth value pose parameter;
wherein the root node position estimation loss function is obtained by calculating a mean squared error between a model predicted root node three-dimensional coordinate parameter and a truth value root node three-dimensional coordinate parameter;
wherein the bone length estimation loss function is obtained by calculating a mean squared error between a model predicted bone parameter and a truth value bone parameter;
wherein the joint point position estimation loss function is obtained by calculating a mean squared error between a model predicted joint point position and a truth value joint point position parameter, and the model predicted joint point position is calculated by the model predicted pose parameter, the model predicted root node three-dimensional coordinate parameter, and the model predicted bone parameter; and
wherein the smoothness loss function is used to output a temporally smooth human pose result.

6. The method according to claim 4, wherein the human pose parameter comprise six-freedom-of-degree information of a human joint point.

7. The method according to claim 6, further comprising:
generating and displaying, based on the human pose parameter, a corresponding human motion in an extended reality environment.

8. An electronic device, comprising:
at least one memory and at least one processor,
wherein the at least one memory is configured to store program code, and the at least one processor is configured to invoke the program code stored in the at least one memory to:
obtain human inertial data collected by an extended reality device; and
obtain human pose information by inputting the human inertial data into a pre-trained motion capture model,
wherein the motion capture model is obtained by training a neural network model based on a preset loss function, and the motion capture model comprises one or more of a neural network for predicting a human pose, a neural network for predicting global displacement information, a neural network for predicting a human bone parameter, and a classification network for predicting a human ground-stepping state, and
wherein the preset loss function is constructed based on a sliding step loss function, and the sliding step loss function is constructed by calculating a temporal motion speed for a foot that is stepping on ground.

9. The electronic device according to claim 8, wherein the extended reality device comprises a head-mounted device, a handheld controller, a waist sensor, and a leg sensor,
wherein the head-mounted device, the handheld controller, the waist sensor, and the leg sensor comprise inertial sensors for collecting human inertial data.

10. The electronic device according to claim 8, wherein the program code further causes the electronic device to: after obtaining the human inertial data collected by the extended reality device, obtain a feature vector for being input into the motion capture model by preprocessing the human inertial data.

11. The electronic device according to claim 8, wherein the program code causing the electronic device to train the neural network model based on the preset loss function further causes the electronic device to:

preprocess and inputting human inertial data for model training into a neural network model, and fuse timing feature information of the human inertial data based on a feature fusion network of the neural network model, wherein the feature fusion network comprises a full connection layer, a normalization layer, and a recurrent neural network;

output a human pose parameter, global displacement information, a human bone parameter, and a human ground-stepping state through the neural network and the classification network; and calculate a corresponding loss value based on the human pose parameter, the global displacement information, the human bone parameter, the human ground-stepping state, and the preset loss function, and adjusting a parameter of the neural network model based on the loss value until the loss value is less than a preset value, ending the training of the neural network model to obtain the motion capture model.

12. The electronic device according to claim 11, wherein the preset loss function is obtained through weighted summation of a human pose prediction loss function, a root node position estimation loss function, a bone length estimation loss function, a joint point position estimation loss function, a smoothness loss function, a ground-stepping binary classification loss function, and the sliding step loss function, wherein the human pose prediction loss function is obtained by calculating a mean squared error between a model predicted human pose parameter and a truth value pose parameter;

wherein the root node position estimation loss function is obtained by calculating a mean squared error between a model predicted root node three-dimensional coordinate parameter and a truth value root node three-dimensional coordinate parameter;

wherein the bone length estimation loss function is obtained by calculating a mean squared error between a model predicted bone parameter and a truth value bone parameter;

wherein the joint point position estimation loss function is obtained by calculating a mean squared error between a model predicted joint point position and a truth value joint point position parameter, and the model predicted joint point position is calculated by the model predicted pose parameter, the model predicted root node three-dimensional coordinate parameter, and the model predicted bone parameter;

wherein the smoothness loss function is used to output a temporally smooth human pose result; and wherein the ground-stepping binary classification loss function is obtained by calculating a binary cross entropy between a model predicted ground-stepping parameter and a truth value ground-stepping parameter.

13. The electronic device according to claim 11, wherein the human pose parameter comprise six-freedom-of-degree information of a human joint point.

14. The electronic device according to claim 13, the program code further causes the electronic device to:

generate and display, based on the human pose parameter, a corresponding human motion in an extended reality environment.

15. A non-transitory computer-readable storage medium, wherein the computer-readable storage medium is configured to store program code, and the program code, when run by a computer device, causes the computer device to:

obtain human inertial data collected by an extended reality device; and obtain human pose information by inputting the human inertial data into a pre-trained motion capture model, wherein the motion capture model is obtained by training a neural network model based on a preset loss function, and the motion capture model comprises one or more of a neural network for predicting a human pose, a neural network for predicting global displacement information, a neural network for predicting a human bone parameter, and a classification network for predicting a human ground-stepping state, and wherein the preset loss function is constructed based on a sliding step loss function, and the sliding step loss function is constructed by calculating a temporal motion speed for a foot that is stepping on ground.

16. The medium according to claim 15, wherein the extended reality device comprises a head-mounted device, a handheld controller, a waist sensor, and a leg sensor, wherein the head-mounted device, the handheld controller, the waist sensor, and the leg sensor comprise inertial sensors for collecting human inertial data.

17. The medium according to claim 15, wherein the program code further causes the computer device to: after obtaining the human inertial data collected by the extended reality device, obtain a feature vector for being input into the motion capture model by preprocessing the human inertial data.

18. The medium according to claim 15, wherein the program code causing the computer device to train the neural network model based on the preset loss function further causes the electronic device to:

preprocess and inputting human inertial data for model training into a neural network model, and fuse timing feature information of the human inertial data based on a feature fusion network of the neural network model, wherein the feature fusion network comprises a full connection layer, a normalization layer, and a recurrent neural network;

output a human pose parameter, global displacement information, a human bone parameter, and a human ground-stepping state through the neural network and the classification network; and calculate a corresponding loss value based on the human pose parameter, the global displacement information, the human bone parameter, the human ground-stepping state, and the preset loss function, and adjusting a parameter of the neural network model based on the loss value until the loss value is less than a preset value, ending the training of the neural network model to obtain the motion capture model.

19. The medium according to claim 18, wherein the preset loss function is obtained through weighted summation of a human pose prediction loss function, a root node position estimation loss function, a bone length estimation loss function, a joint point position estimation loss function, a smoothness loss function, a ground-stepping binary classi-
fication loss function, and the sliding step loss function, wherein the human pose prediction loss function is
obtained by calculating a mean squared error between
a model predicted human pose parameter and a truth
value pose parameter;

wherein the root node position estimation loss function is
obtained by calculating a mean squared error between
a model predicted root node three-dimensional coordi-
nate parameter and a truth value root node three-
dimensional coordinate parameter;

wherein the bone length estimation loss function is
obtained by calculating a mean squared error between
a model predicted bone parameter and a truth value
bone parameter;

wherein the joint point position estimation loss function is
obtained by calculating a mean squared error between
a model predicted joint point position and a truth value
joint point position parameter, and the model predicted
joint point position is calculated by the model predicted
pose parameter, the model predicted root node three-
dimensional coordinate parameter, and the model pre-
dicted bone parameter;

wherein the smoothness loss function is used to output a
temporally smooth human pose result; and wherein the ground-stepping binary classification loss
function is obtained by calculating a binary cross
entropy between a model predicted ground-stepping
parameter and a truth value ground-stepping parameter.

20. The medium according to claim 18, wherein the
human pose parameter comprise six-freedom-of-degree
information of a human joint point.

* * * * *